(12) United States Patent
Johnson et al.

(10) Patent No.: US 9,167,220 B2
(45) Date of Patent: *Oct. 20, 2015

(54) SYNCHRONIZED STREAM PACKING

(75) Inventors: Mark Rogers Johnson, Pasadena, CA (US); Ralf Ostermann, Hannover (DE); Joseph Sanderson Rice, Berkeley, CA (US)

(73) Assignee: THOMSON LICENSING, Boulogne-Billancourt (FR)

( * ) Notice: Subject to any disclaimer, the term of this patent is extended or adjusted under 35 U.S.C. 154(b) by 1948 days.

This patent is subject to a terminal disclaimer.

(21) Appl. No.: 11/918,511

(22) PCT Filed: Mar. 16, 2006

(86) PCT No.: PCT/US2006/009588
§ 371 (c)(1),
(2), (4) Date: Oct. 15, 2007

(87) PCT Pub. No.: WO2006/115606
PCT Pub. Date: Nov. 2, 2006

(65) Prior Publication Data
US 2009/0067813 A1    Mar. 12, 2009

Related U.S. Application Data

(60) Provisional application No. 60/674,767, filed on Apr. 26, 2005.

(51) Int. Cl.
*H04N 5/76* (2006.01)
*H04N 9/80* (2006.01)
(Continued)

(52) U.S. Cl.
CPC ............. *H04N 9/87* (2013.01); *G11B 27/10* (2013.01); *G11B 27/105* (2013.01);
(Continued)

(58) Field of Classification Search
USPC .......... 386/328–330, 334, 337–341, 353–357
See application file for complete search history.

(56) References Cited

U.S. PATENT DOCUMENTS 5,784,528 A * 7/1998 Yamane et al. ............... 386/329
5,838,678 A   11/1998 Davis et al.
(Continued)

FOREIGN PATENT DOCUMENTS

EP      727780      8/1996
EP      843312      5/1998
(Continued)

OTHER PUBLICATIONS

Taylor, J.: "DVD Demystified, PASSAGE—Application Details: DVD-Video and DVD-Audio," 2001, New York: McGraw-Hill, US, pp. 255-266, 311, 312 and 343, XP002395959.

*Primary Examiner* — Hung Dang
(74) *Attorney, Agent, or Firm* — Robert D. Shedd; Robert B. Levy

(57) ABSTRACT

There are provided methods and apparatus for synchronized stream packing of packets that differ contextually between A/V streams in a parallel presentation. A method includes the step of identifying sub-picture/subtitle packets and/or audio packets having arrival timestamps and/or presentation timestamps that match an arrival timestamp and/or a presentation timestamp, respectively, of video packets. The method also includes the step of packing a Video Object Unit (VOBU) and/or a Transport Stream (TS) with the identified sub-picture/subtitle and audio packets and the video packets having the matching timestamps.

4 Claims, 5 Drawing Sheets

(51) Int. Cl.

| | |
|---|---|
| H04N 5/92 | (2006.01) |
| H04N 9/87 | (2006.01) |
| G11B 27/10 | (2006.01) |
| G11B 27/30 | (2006.01) |
| H04N 21/234 | (2011.01) |
| H04N 21/2343 | (2011.01) |
| H04N 21/235 | (2011.01) |
| H04N 21/236 | (2011.01) |
| H04N 21/2365 | (2011.01) |
| H04N 21/2368 | (2011.01) |
| H04N 21/2381 | (2011.01) |
| H04N 21/43 | (2011.01) |
| H04N 21/434 | (2011.01) |
| H04N 21/435 | (2011.01) |
| H04N 21/4363 | (2011.01) |
| H04N 21/438 | (2011.01) |
| H04N 21/44 | (2011.01) |
| H04N 21/4402 | (2011.01) |
| H04N 21/488 | (2011.01) |
| H04N 21/8547 | (2011.01) |

(52) U.S. Cl.
CPC ......... *G11B 27/3027* (2013.01); *H04N 21/235* (2013.01); *H04N 21/2365* (2013.01); *H04N 21/2368* (2013.01); *H04N 21/2381* (2013.01); *H04N 21/23424* (2013.01); *H04N 21/23614* (2013.01); *H04N 21/234318* (2013.01); *H04N 21/434* (2013.01); *H04N 21/435* (2013.01); *H04N 21/4307* (2013.01); *H04N 21/4341* (2013.01); *H04N 21/4347* (2013.01); *H04N 21/4348* (2013.01); *H04N 21/4363* (2013.01); *H04N 21/4381* (2013.01); *H04N 21/44016* (2013.01); *H04N 21/440209* (2013.01); *H04N 21/4884* (2013.01); *H04N 21/8547* (2013.01); *G11B 2220/2562* (2013.01)

(56) References Cited

U.S. PATENT DOCUMENTS

| | | | | |
|---|---|---|---|---|
| 6,122,436 | A * | 9/2000 | Okada et al. | 386/334 |
| 6,363,208 | B2 * | 3/2002 | Nitta et al. | 386/344 |
| 6,377,518 | B1 | 4/2002 | Auwens et al. | |
| 6,393,196 | B1 | 5/2002 | Yamane et al. | |
| 6,393,574 | B1 | 5/2002 | Kashiwagi et al. | |
| 6,480,666 | B1 | 11/2002 | Wilson et al. | |
| 6,502,198 | B2 | 12/2002 | Kashiwagi et al. | |
| 6,502,199 | B2 | 12/2002 | Kashiwagi et al. | |
| 6,502,200 | B2 | 12/2002 | Kashiwagi et al. | |
| RE37,994 | E | 2/2003 | Fukuda et al. | |
| 6,516,139 | B2 | 2/2003 | Kashiwagi et al. | |
| 6,519,414 | B2 | 2/2003 | Kashiwagi et al. | |
| 6,526,226 | B2 | 2/2003 | Kashiwagi et al. | |
| 6,567,086 | B1 | 5/2003 | Hashimoto | |
| 6,580,870 | B1 | 6/2003 | Kanazawa | |
| 6,748,159 | B2 | 6/2004 | Wilson et al. | |
| 7,693,394 | B2 | 4/2010 | Seo et al. | |
| 7,869,690 | B2 | 1/2011 | Kato | |
| 8,081,871 | B2 | 12/2011 | Takakuwa et al. | |
| 2002/0044609 | A1 | 4/2002 | Ueda | |
| 2003/0123556 | A1 | 7/2003 | Komori | |
| 2005/0019016 | A1 | 1/2005 | Nakashika et al. | |
| 2005/0022232 | A1 | 1/2005 | Green | |
| 2005/0053364 | A1 | 3/2005 | Nagal | |
| 2005/0114909 | A1 | 5/2005 | Mercier | |
| 2005/0141863 | A1 | 6/2005 | De Haan | |
| 2005/0206783 | A1 | 9/2005 | Kato | |
| 2006/0152786 | A1 | 7/2006 | Takakuwa et al. | |
| 2006/0271983 | A1 * | 11/2006 | Katayama et al. | 725/100 |

FOREIGN PATENT DOCUMENTS

| | | | |
|---|---|---|---|
| EP | 847195 | 6/1998 | |
| EP | 847196 | 6/1998 | |
| EP | 847197 | 6/1998 | |
| EP | 847198 | 6/1998 | |
| EP | 847200 | 6/1998 | |
| EP | 876063 | 11/1998 | |
| EP | 918438 | 5/1999 | |
| EP | 920202 | 6/1999 | |
| EP | 920203 | 6/1999 | |
| EP | 930782 | 7/1999 | |
| EP | 1003338 | 5/2000 | |
| EP | 1202568 | 5/2002 | |
| EP | 1337116 | 8/2003 | |
| EP | 1357749 | 10/2003 | |
| EP | 1389777 | 2/2004 | |
| EP | 1435736 | 7/2004 | |
| EP | 1486980 | 12/2004 | |
| EP | 1566965 | 8/2005 | |
| GB | 2402541 | 12/2004 | |
| JP | 2000/339933 | 8/2000 | |
| JP | 2000/298918 | 10/2000 | |
| JP | 2004/127399 | 4/2004 | |
| JP | 2004/335102 | 11/2004 | |
| JP | 2005/109685 | 4/2005 | |
| WO | WO9952067 | 10/1999 | |
| WO | WO00/30112 | 5/2000 | |
| WO | WO00/30113 | 5/2000 | |
| WO | WO01/35415 | 5/2001 | |
| WO | WO03/079358 | 9/2003 | |
| WO | WO2004/045206 | 5/2004 | |
| WO | WO2004/082272 | 9/2004 | |
| WO | WO2004/090364 | 10/2004 | |
| WO | WO2004/109678 | 12/2004 | |
| WO | WO2004/109679 | 12/2004 | |
| WO | WO 2005/002221 A1 * | 1/2005 | H04N 5/92 |
| WO | WO2005/006412 | 1/2005 | |

* cited by examiner

SYNCHRONIZED STREAM PACKING

CROSS-REFERENCE TO RELATED APPLICATIONS

This application claims a National Stage Application and claims the benefit, under 35 U.S.C. §365 of International Application PCT/US2006/009588 filed Mar. 16, 2006, which was published in accordance with PCT Article 21(2) on Nov. 2, 2006 in English, and which claims the benefit of U.S. provisional patent application No. 60/674,767 which was filed Apr. 26, 2005.

FIELD OF THE INVENTION

The present invention relates generally to Digital Versatile Discs, previously known as Digital Video Discs (DVDs), High Definition Digital Versatile Discs (HD DVD), and Blu-Ray Disc (BD), and more particularly to a technique for facilitating synchronization among the sub-streams of different audio/visual (A/V) streams embedded on a DVD, HD DVD, or BD.

BACKGROUND OF THE INVENTION

The DVD, HD DVD and Blu-ray specifications currently define mechanisms for seamlessly switching among multiple parallel A/V streams. However, in each case, the audio and sub-picture content of the streams is restricted to be bit-for-bit identical among all of the streams. This prevents any potential damage to audio speakers that could result from signal spikes caused by differences in the audio data from one A/V stream to another, and also reduces the restrictions regarding organization of such data within each multiplexed A/V stream. However, these restrictions also greatly limit the range of applications for which the seamless multi-angle feature may be used.

The development of the DVD followed the development of the Compact Disk (CD) in an effort to achieve sufficient storage capacity for large video files to enable a single disc to carry a full length motion picture, albeit compressed using a compression technique such as the Moving Picture Expert Group compression (MPEG) technique. Since its first introduction in the mid 1990s, the DVD has proliferated, becoming the preferred medium of choice for wide scale distribution of motion picture and video content to consumers. Similar optical disc formats for delivery of higher quality and greater amounts of audiovisual content have been developed as planned successors to DVD. Two of the most prominent formats are known as HD DVD and BD.

Present day DVDs, HD DVDS, and BDs typically include at least one, and usually several A/V streams in parallel synchronism to each other. Often such A/V streams include different recordings of the same scene shot from a different angle. Hence, such different A/V streams are often referred to as "angles". Selection of different angles (i.e., different streams) occurs through a process known as "multi-angle navigation" whereby a viewer selects a desired angle by selecting an associated icon on a display screen. The DVD, HD DVD, and BD specifications adopted by the manufacturers of these discs and associated playback devices define a process known as "multi-angle video" whereby a content author can define as many as nine concurrent A/V streams, any one of which can appear on a display screen at any time. During playback, the viewer can switch seamlessly among a set of synchronized A/V streams by actuating a command via a button on a DVD, HD DVD, or BD player or on the remote control device for such player; this form of multi-angle navigation is known as seamless multi-angle. However, under known format specifications and implementations of currently available DVD, HD DVD, and BD authoring tools, audio and sub-picture data stored in each A/V stream remains identical. That is, only different video data is allowed between angles. Sub-picture data describes the rendering of buttons, subtitles, and other graphical elements displayed over video. This results both in an inability to automatically present different audio and sub-picture content when a parallel A/V stream is selected and also leads to redundant copies of audio and sub-picture data being stored on the delivery medium, limiting space for other content.

A/V streams are constituted at a basic level of data packets for the sub-streams (audio, video, and sub-picture) which are joined together in short units which, when read sequentially, comprise the presented stream. In DVD-Video, these fundamental data units are known as Video Object Units, or VOBUs, and each include about 0.4 to 1 second of presentation data. In HD DVD-Video, these are known as EVOBUs. The terms VOBUs and EVOBUs may be used interchangeably herein for illustrative purposes. When multiple A/V streams are presented in parallel, each stream collects one or more VOBUs into an Interleave Unit, or ILVU, which are synchronized with ILVUs for other parallel A/V streams based on the video presentation time. Thus, when a new stream is selected, the data from the current ILVU plays until the end of the ILVU and the ILVU for the new stream is presented seamlessly at that time. In this way, seamless presentation of video is assured.

BD refers to a similar combination of packets using different terminology, namely Transport Stream (TS). BD does not limit the duration of presentation data in the unit, using instead of ILVUs, angle change points in each TS to mark points at which streams can be changed while ensuring video continuity.

Audio, video, and sub-picture packets in VOBUs, TS, RTP or other packetized multimedia formats are all typically marked with a first type of timestamp indicating when they should be delivered for decoding and a second type of timestamp indicating when they should be presented. In the case of VOBUs, the delivery timestamps are encoded in the "system_clock_reference" as defined in ISO/IEC13818-1. In the case of Transport Streams (TSs), delivery timestamps are typically called "arrival_timestamps" as defined in some of the specifications derived from ISO/IEC 13818-1. As used herein, the term "arrival_timestamp" collectively refers to the delivery timestamp in VOBUs and TSs. The presentation timestamps are the usual PTSs as defined in ISO/IEC13818-1.

Due to different buffering models and decoder designs, non-video packets in a single VOBU (or at an angle change point marker in a TS) may not all refer to similar presentation times. For example, an audio packet may refer to presentation time 8, whereas a video packet may refer to presentation time 4, the audio packet for presentation time 4 having been delivered from a previous VOBU. When audio and sub-picture/subtitle data are identical between VOBUs in ILVUs (or between TSs) for different A/V streams in a parallel presentation, switching ILVUs or TSs has no effect on audio, sub-picture/subtitle, and video synchronization or correspondence/synchronization. However, when audio and sub-picture data packets differ between VOBUs or TSs for different A/V streams, a case could occur where audio or sub-picture/subtitle packets corresponding to the presentation time of the video from the new VOBU or TS have already been delivered from a previous VOBU or TS, resulting in audio or sub-picture/subtitle presentation that, while presented at the proper time, is out of correspondence/synchronization with the current context.

Thus, there exists a need for a method of storing data in a way that audio and sub-picture data are contextually different in parallel, synchronized A/V streams playing from any one of these optical disc formats and also maintain stream continuity as well as synchronization with video data as the viewer interactively selects different A/V streams during the presentation.

SUMMARY OF THE INVENTION

These and other drawbacks and disadvantages of the prior art are addressed by the present invention, which is directed to synchronized stream packing.

According to an aspect of the present invention, there is provided a method for synchronized stream packing of packets that differ contextually between A/V streams in a parallel presentation. The method includes the step of identifying sub-picture/subtitle packets and/or audio packets having arrival timestamps and/or presentation timestamps that match an arrival timestamp and/or a presentation timestamp, respectively, of video packets. The method also includes the step of packing a Video Object Unit (VOBU) and/or a Transport Stream (TS) with the identified sub-picture/subtitle and audio packets and the video packets having the matching timestamps.

According to yet another aspect of the present invention, there is provided an apparatus for synchronized stream packing of packets that differ contextually between A/V streams in a parallel presentation. The apparatus includes means for identifying sub-picture/subtitle packets and/or audio packets having arrival timestamps and/or presentation timestamps that match an arrival timestamp and/or a presentation timestamp, respectively, of video packets. The apparatus also includes means for packing a Video Object Unit (VOBU) and/or a Transport Stream (TS) with the identified sub-picture/subtitle and audio packets and the video packets having the matching timestamps.

According to a further aspect of the present invention, there is provided a method for presenting a different A/V stream from among a plurality of A/V streams that differ contextually in a parallel presentation. The method includes the step of packing an audio frame header into an audio packet at, a beginning of a first Video Object Unit (VOBU) in an InterLeaVe Unit (ILVU), or, an angle change point marker in a Transport Stream (TS). The method also includes the step of packing a last audio packet, in a last VOBU in the ILVU or another ILVU in a same one of the plurality of A/V streams, or, immediately prior to another angle change point marker in the TS, so as to conclude with a complete audio frame.

These and other aspects, features and advantages of the present invention will become apparent from the following detailed description of exemplary embodiments, which is to be read in connection with the accompanying drawings.

BRIEF DESCRIPTION OF THE DRAWINGS

The present invention may be better understood in accordance with the following exemplary figures, in which.

DETAILED DESCRIPTION

Figure 1:
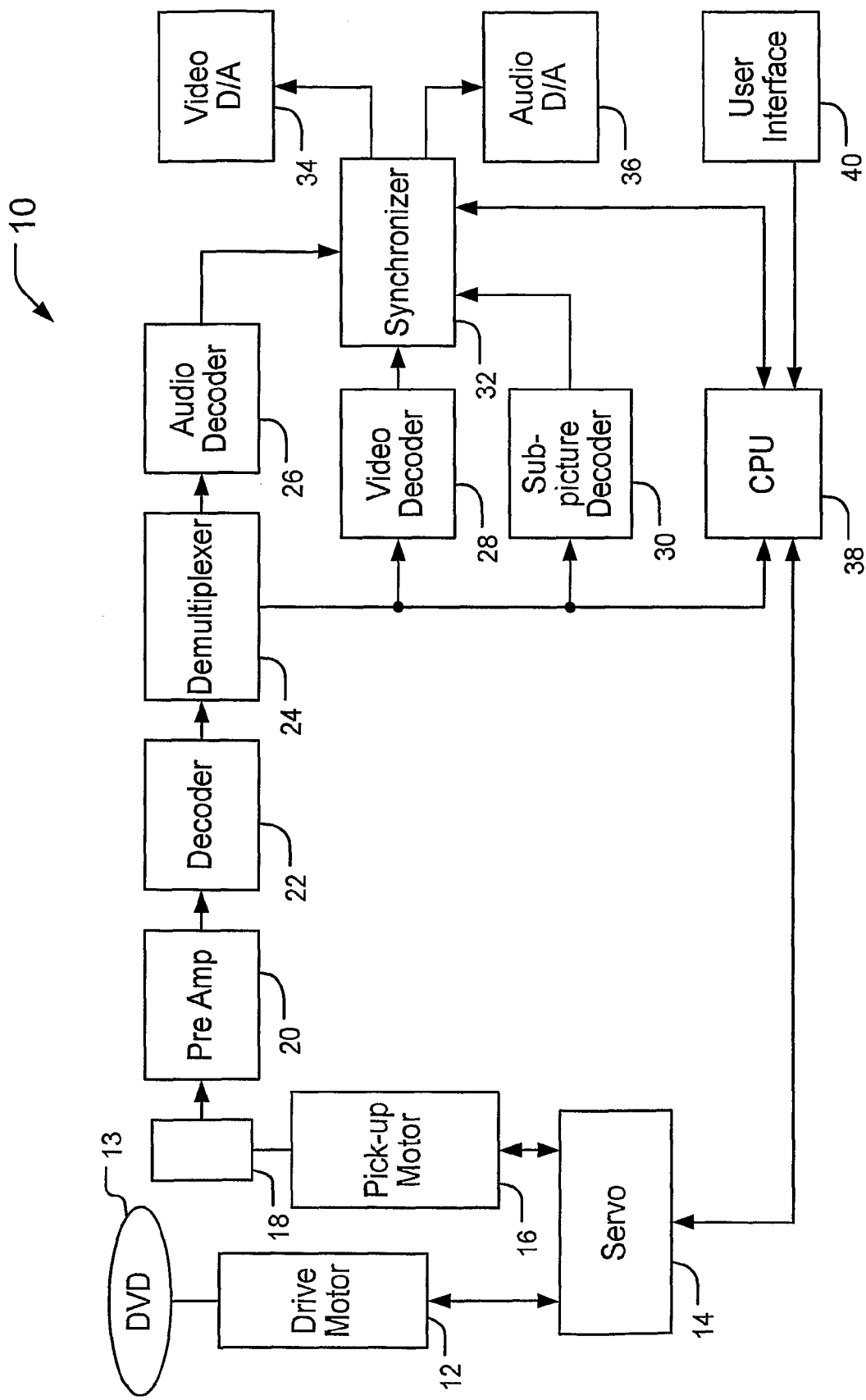
FIG. 1 is a block diagram illustrating a DVD player to which the present invention may be applied, in accordance with an illustrative embodiment thereof.

The present invention is directed to synchronized stream packing. In accordance with an embodiment, a method is provided for constraining the organization of audio and sub-picture packets within multiplexed streams (e.g., MPEG program and transport streams) in order to allow seamless switching among multiple interleaved audio/video (A/V) presentations in which the audio content and/or sub-picture/subtitle content is different.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Turning to FIG. 1, a Digital Versatile Disc (DVD) player 10 to which the present invention may be applied is indicated generally by the reference numeral 10. The DVD player 10 includes a drive motor 12 that rotates a DVD 13 under the control of a servomechanism 14. A pick-up head motor 16, also controlled by the servomechanism 14, serves to displace an optical pick-up head 18 across the DVD 13 to read information carried thereby. A pre-amplifier 20 amplifies the output signal of the pick-up head 18 for input to a decoder 22 that decodes the optical information read from the DVD 13 to yield a program stream. A de-multiplexer 24 de-multiplexes the program stream into separate components: (a) an audio stream; (b) a video stream; (c) a sub-picture stream; and (d) navigation information, typically in the form of metadata or the like.

The audio, video, and sub-picture streams undergo decoding by a separate one of the audio decoder 26, video decoder 28 and sub-picture decoder 30, respectively. A synchronizer 32, sometimes known as a presentation engine, serves to synchronize and combine the separately decoded audio, video and sub-picture streams into a video stream, with embedded audio for suitable reproduction in accordance with one of several known television formats including, but not limited to NTSC or PAL. A video digital-to-analog converter 34 converts the video stream into analog video for display on a display device (not shown) such as a television set, while an audio digital-to-analog-converter 36 converts the embedded audio to analog audio for subsequent reproduction by the display device or by other means (not shown).

Within the DVD player 10, a central processing unit (CPU) 38, typically in the form of a microprocessor with associated memory, or a microcomputer or microcontroller, serves to control navigation, as well as other aspects of the DVD player, in accordance with viewer commands entered through a viewer interface (U/I) 40, typically comprising the combination of an Infrared (I/R) transmitter, in the form of remote control, and an I/R receiver. Specifically with regard to navigation, the CPU 38 receives decoded metadata from the demultiplexer 24 and generates menu information for receipt by the synchronizer 32. In this way, the menu information ultimately undergoes display for viewing by the viewer. In response to the displayed information, the viewer typically will enter one or more commands through the U/I 40 for receipt by the CPU 38, which in turn, controls the servomechanism 14 to displace the pick-up head 18 to retrieve the desired program content.

The DVD specification (DVD Specifications for Read-Only Disc/Part 3. VIDEO SPECIFICATIONS, Version 1.0, August 1996), defines the smallest object to which DVD navigation can apply as a Video Object Unit (VOBU). The VOBU typically includes multiplexed video, audio, sub-picture, highlight and other navigation data, corresponding to a playback duration of about 0.4 to 1.2 seconds. Multiple sub-streams of audio and sub-picture data can exist in each VOBU (e.g., stereo and surround sound audio sub-streams and/or German and Portuguese subtitles). This combination of such multiplexed data constitutes an "A/V stream." In a multi-angle segment, multiple A/V streams are interleaved together into a single Video Object (VOB) stream in order to allow quick access from one stream to another for seamless or near-seamless switching.

The DVD specification defines an Interleave Unit (ILVU) as a block of one or more VOBUs in order to align the A/V stream content of multiple angles with a common time stamp, providing synchronization of the A/V streams. During playback, the synchronizer 32 decodes and displays only the ILVUs corresponding to the currently selected A/V stream. The DVD specification defines a maximum size of the ILVU based on number of angles (i.e., number of available streams), scan speed of the physical device, and size of the decode buffer (not shown). If this maximum size is exceeded, seamless playback of any angle cannot be guaranteed.

In accordance with an embodiment, there is provided a method for the storage of sub-picture/subtitle and/or audio data within at least one of a plurality of audio-visual streams presented in parallel in order to maintain synchronization between sub-picture/subtitle, audio, and video data as well as provide continuity between such data as different Audio/Visual (A/V) streams are selected during a presentation.

To ensure a constant synchronization and correspondence with video of audio and sub-picture/subtitle packets which differ contextually between A/V streams in a parallel presentation, Video Object Units (VOBUs) or Transport Streams (TSs) should include sub-picture/subtitle and audio packets whose arrival timestamps match the arrival timestamp of the video packets (within one unit of time reference of the sub-picture/subtitle or audio packet, respectively). It is to be appreciated that sub-picture/subtitle typically have no innate frame rate, instead their frame rate is usually somehow derived or related to the video frame rate. The same rule applies to the presentation timestamps, VOBUs or TSs should include sub-picture/subtitle and audio packets whose presentation timestamps match the presentation timestamp of the video packets (within one unit of time reference of the sub-picture/subtitle or audio packet, respectively). If VOBUs or TSs are packed in this way, both synchronization and contextual correspondence between audio, sub-picture/subtitle, and video data is maintained where audio or sub-picture/subtitle data differs contextually between VOBUs or TSs for different A/V streams.

A further issue is the potential corruption of audio or sub-picture/subtitle data when an ILVU for a new A/V stream is presented, as audio or sub-picture data packets at the beginning of the first VOBU in that ILVU (or at the angle change point marker of a TS) may be fragmented, and unable to be decoded until a subsequent, whole, packet occurs.

To resolve this issue, the audio data packet at the start of the first VOBU in an ILVU (or at an angle change point marker of a TS) should include an audio frame header, and the last audio packet in the last VOBU in an ILVU (or the last audio packet immediately prior to an angle change point marker in a TS) should include a complete audio frame, i.e., no audio frame fragmentation should occur across any ILVU boundary (or across any angle change point marker). Similarly sub-picture/subtitle data must start with a Sub-Picture Unit (SPU) header or an Epoch start header.

Figure 2:
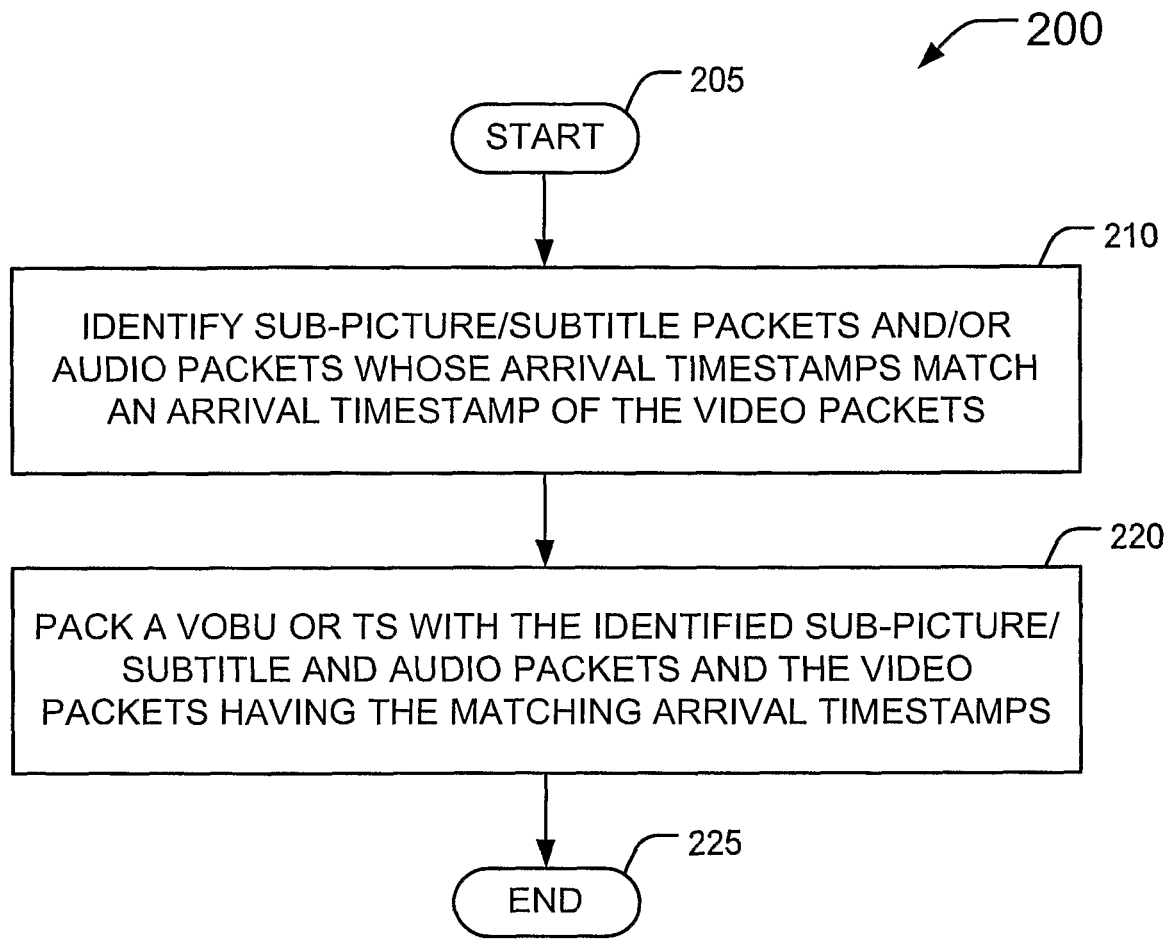
FIG. 2 is a flow diagram illustrating a method for synchronized stream packing of packets that differ contextually between A/V streams in a parallel presentation in accordance with the present principles.

Turning to FIG. 2, a method for synchronized stream packing of packets that differ contextually between A/V streams in a parallel presentation is indicated generally by the reference numeral 200.

The method 200 includes a start block 205 that passes control to a function block 210. The function block 210 identifies sub-picture/subtitle packets and/or audio packets whose arrival timestamps match an arrival timestamp of the video packets, and passes control to a function block 220.

The function block 220 packs a Video Object Unit (VOBU) or a Transport Stream (TS) with the identified sub-picture/subtitle and audio packets and the video packets having the matching arrival timestamps, and passes control to an end block 225. The end block 225 terminates the method.

Figure 3:
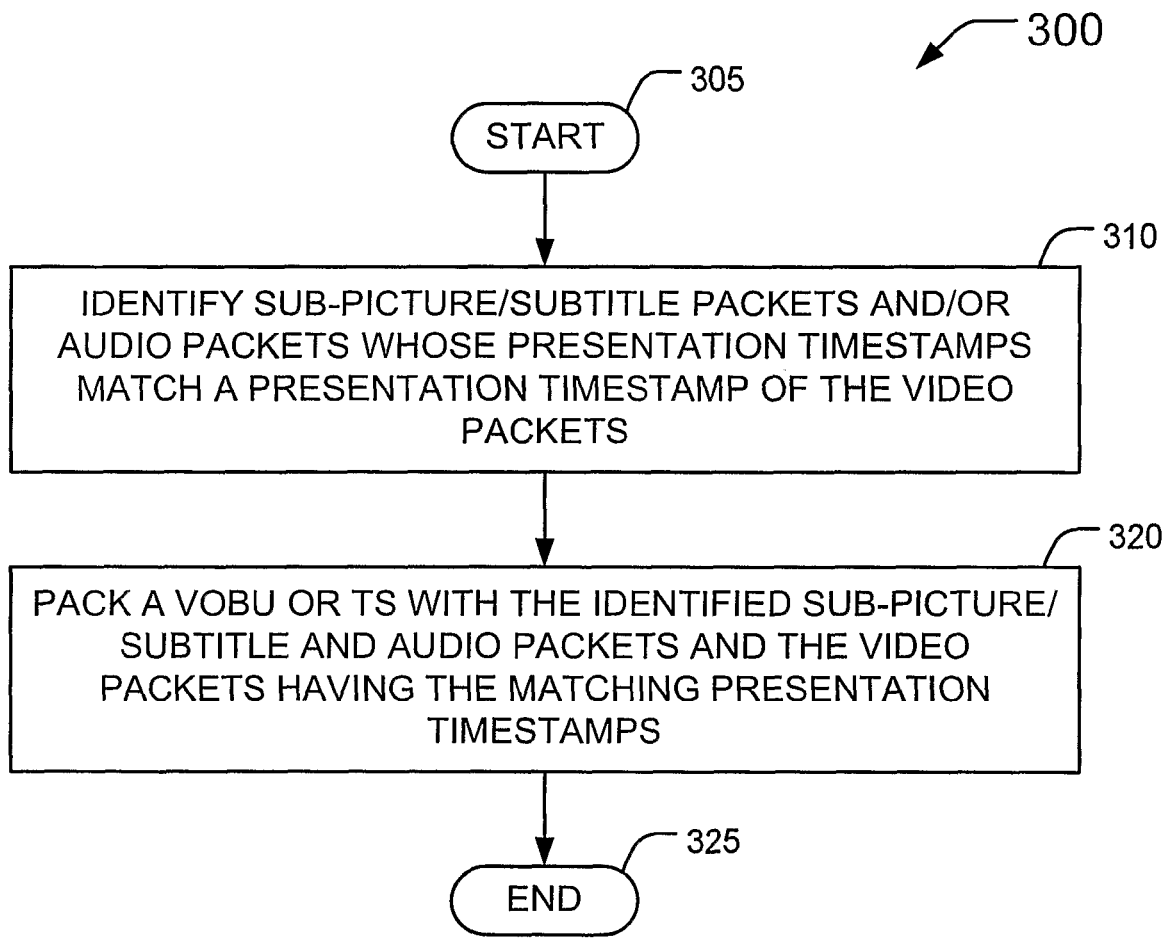
FIG. 3 is a flow diagram illustrating a method for synchronized stream packing of packets that differ contextually between A/V streams in a parallel presentation in accordance with the present principles.

Turning to FIG. 3, a method for synchronized stream packing of packets that differ contextually between A/V streams in a parallel presentation is indicated generally by the reference numeral 300.

The method 300 includes a start block 305 that passes control to a function block 310. The function block 310 identifies sub-picture/subtitle packets and/or audio packets whose presentation timestamps match a presentation timestamp of the video packets, and passes control to a function block 320. The function block 320 packs a Video Object Unit (VOBU) or a Transport Stream (TS) with the identified sub-picture/subtitle and audio packets and the video packets having the matching presentation timestamps, and passes control to an end block 325. The end block 325 terminates the method.

Figure 4:
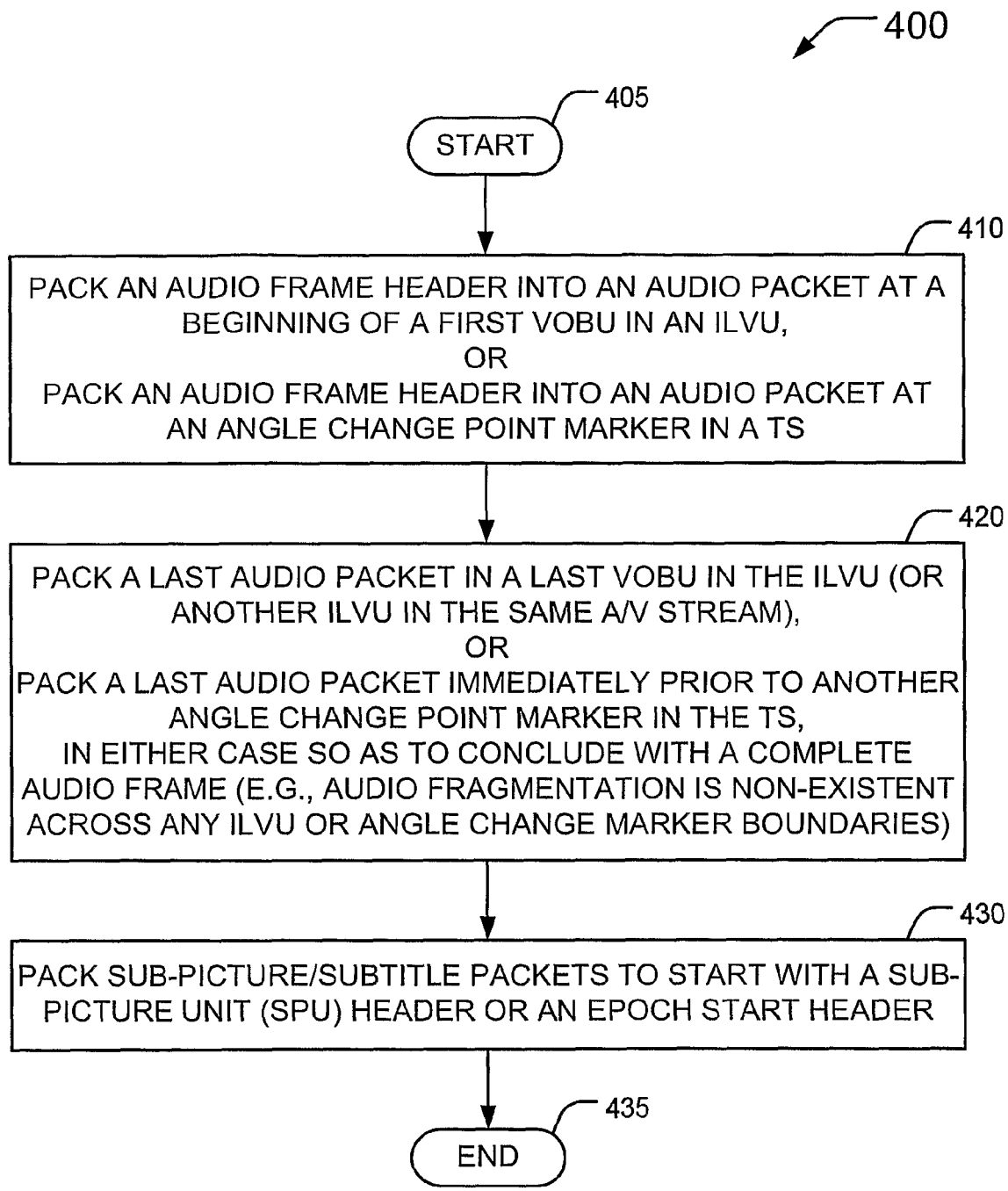
FIG. 4 is a flow diagram illustrating a method for presenting a different A/V stream from among a plurality of A/V streams that differ contextually in a parallel presentation in accordance with the present principles.

Turning to FIG. 4, a method for presenting a different A/V stream from among a plurality of A/V streams that differ contextually in a parallel presentation is indicated generally by the reference numeral 400.

The method 400 includes a start block 405 that passes control to a function block 410. The function block 410 packs an audio frame header into an audio packet at a beginning of a first Video Object Unit (VOBU) in an InterLeaVe Unit (ILVU), or packs an audio frame header into an audio packet at an angle change point marker in a Transport Stream (TS), and passes control to a function block 420.

The function block 420 packs a last audio packet in a last VOBU in the ILVU (or in another ILVU in the same A/V stream), or packs a last audio packet immediately prior to another angle change point marker in the TS, so as to conclude with a complete audio frame (audio frame fragmentation is non-existent across any ILVU boundaries or angle change markers), and passes control to a function block 430.

The function block 430 packs sub-picture/subtitle packets to start with a Sub-Picture Unit (SPU) header or an Epoch start header, and passes control to an end block 435. The end block 435 terminates the method.

Figure 5:
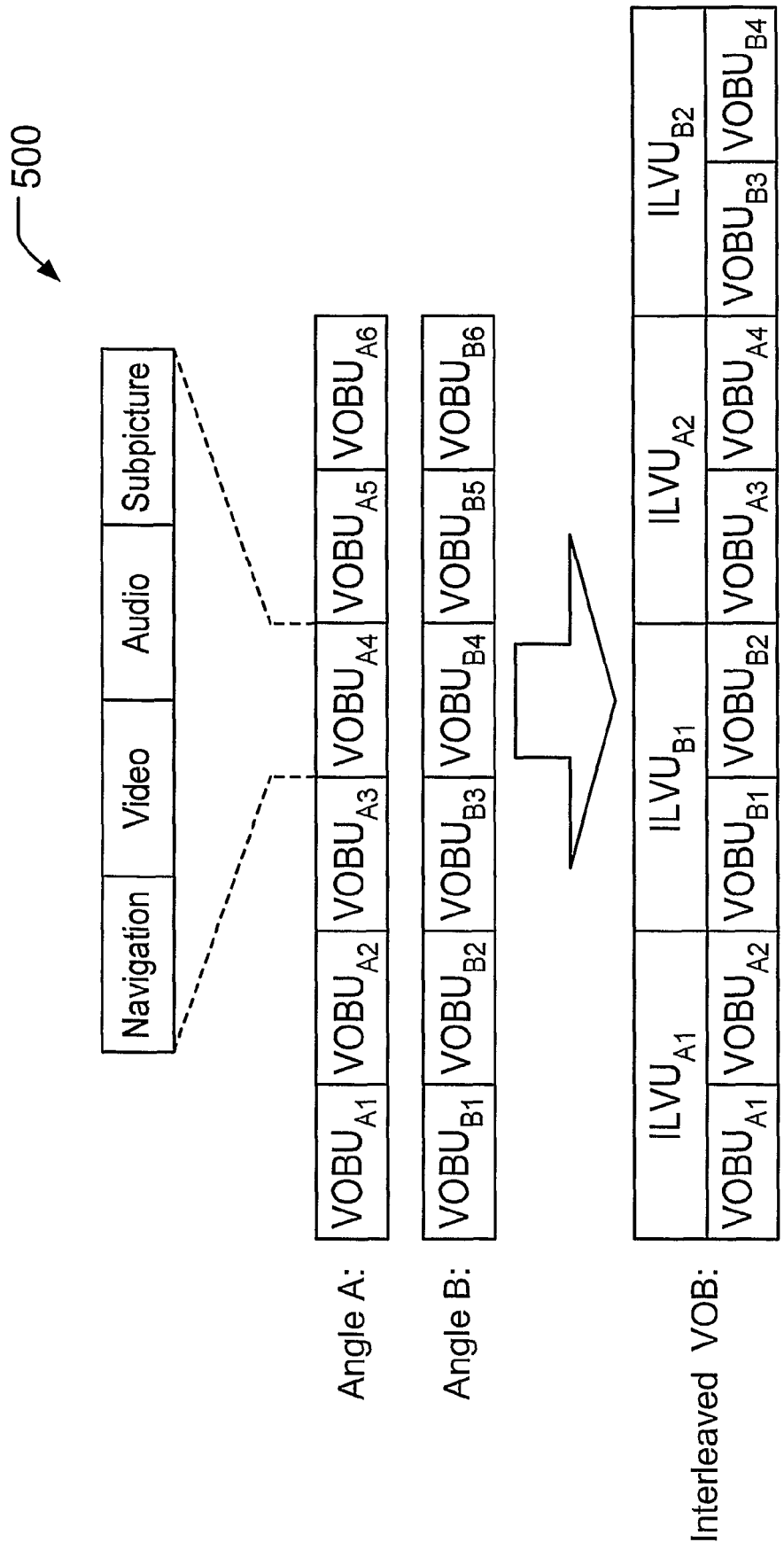
FIG. 5 is a block diagram illustrating the relationship among an audio/visual stream, Video Object Units (VOBUs) and an Interleave Units (ILVUs)

Turning to FIG. 5, the relationship of multiplexed A/V stream data to VOBU and ILVU data structures for multi-angle video is indicated generally by the reference numeral 500. As illustrated in FIG. 5, each block of the program stream decoded by the decoder 22 of FIG. 1 includes a navigation packet (NV_PCK), a video packet (V_PCK), an audio packet (A_PCK) and a sub-picture packet (SP_PCK). The DVD specification defines a Seamless Angle Information data structure (SML_AGLI) in the navigation data structure (DSI) portion of the NV_PCK at the beginning of each VOBU that includes a table of ILVU start points indicating the location where the next ILVU for each seamless angle is located. Such information enables the CPU 38 of FIG. 1 to control the servomechanism 14 where to go within the VOB stream when it is ready to begin presenting the next ILVU.

In addition, the DVD specification defines several data structures within a portion of the navigation data at the beginning of each VOBU that describe the Highlight Information (HLI) for interactive buttons. These data structures, such as the Highlight General Information (HLI_GI), Button Color Information Table (BTN_COLIT), and Button Information Table (BTN_IT) define the number, position, appearance, and function of the buttons that appear in the screen display.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software. Moreover, the software is preferably implemented as an application program tangibly embodied on a program storage unit. The application program may be uploaded to, and executed by, a machine comprising any suitable architecture. The various processes and functions described herein may be either part of the microinstruction code or part of the application program, or any combination thereof, which may be executed by a CPU.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

The invention claimed is:

1. A method for presenting a different A/V stream from among a plurality of A/V streams that differ contextually in a presentation of multiple parallel A/V streams, comprising:

Packing an audio frame header into an audio packet at an angle change point in a Transport Stream (TS); and Packing a last audio packet immediately prior to another angle change point in the TS, so as to conclude with a complete audio frame.

2. The method of claim 1, wherein the method is performed in a Blue-Ray Disk (BD) player.

3. The method of claim 1, further comprising the step of packing sub-picture/subtitle packets to start with one of a Sub-Picture Unit (SPU) header and an Epoch start header.

4. A non-transitory program storage device readable by machine, tangibly embodying a program of instructions executable by the machine to perform method steps for presenting a different A/V stream from among a plurality of A/V streams that differ contextually in a parallel presentation, as recited in claim 1.

* * * * *